(12) United States Patent
Byun et al.

(10) Patent No.: US 8,551,581 B2
(45) Date of Patent: Oct. 8, 2013

(54) LIQUID CRYSTAL DISPLAY

(75) Inventors: Ho Yun Byun, Asan-si (KR); Duck Jong Suh, Seoul (KR); Won-Gap Yoon, Suwon-si (KR); Na-Young Shin, Seoul (KR); Sang Hee Yu, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 189 days.

(21) Appl. No.: 13/182,151

(22) Filed: Jul. 13, 2011

(65) Prior Publication Data
US 2012/0206681 A1    Aug. 16, 2012

(30) Foreign Application Priority Data

Feb. 10, 2011 (KR) .......................... 10-2011-0011964

(51) Int. Cl.
*G02F 1/1337*    (2006.01)
(52) U.S. Cl.
USPC .......................... 428/1.25; 428/1.26; 349/124

(58) Field of Classification Search
USPC ................ 428/1.25–1.26; 349/123–124, 135
See application file for complete search history.

(56) References Cited

U.S. PATENT DOCUMENTS

| | | | | |
|---|---|---|---|---|
| 6,001,277 A | * | 12/1999 | Ichimura et al. | 252/299.4 |
| 2006/0066797 A1 | * | 3/2006 | Baek | 349/139 |
| 2007/0232780 A1 | * | 10/2007 | Tamura | 528/310 |

OTHER PUBLICATIONS

KR 2010-0059693, Yuko et al., Jun. 4, 2010. Already present in prior art section of papers filed Mar. 21, 2013 in IFW.*

* cited by examiner

*Primary Examiner* — Sophie Hon
(74) *Attorney, Agent, or Firm* — H.C. Park & Associates, PLC

(57) ABSTRACT

A liquid crystal display includes: a first substrate and an opposing second substrate; an alignment layer formed on the first substrate and the second substrate; and a liquid crystal layer interposed between the first substrate and the second substrate. The alignment layer includes a copolymer including a dianhydride monomer and a diamine monomer.

6 Claims, 2 Drawing Sheets

LIQUID CRYSTAL DISPLAY

CROSS-REFERENCE TO RELATED APPLICATION

This application claims priority to and the benefit of Korean Patent Application No. 10-2011-0011964 filed on Feb. 10, 2011, which is hereby incorporated by reference for all purposes as if fully set forth herein.

BACKGROUND OF THE INVENTION

1. Field of the Invention

Exemplary embodiments of the present invention relate to a liquid crystal display including an alignment layer.

2. Description of the Related Art

Liquid crystal displays (LCDs) are one of the most widely used type of flat panel display. An LCD includes a pair of panels provided with field-generating electrodes and a liquid crystal (LC) layer interposed between the two panels. An LCD displays images by applying signals to the field-generating electrodes, to generate an electric field in the LC layer. The electric field determines the orientation of LC molecules therein, to adjust the polarization of incident light.

The panels include a thin film transistor array panel and an opposing common electrode panel. The thin film transistor array panel includes a gate line transmitting a gate signal and a data line transmitting a data signal and that intersects the gate line, a thin film transistor connected to the gate line and the data line, and a pixel electrode connected to the thin film transistor. The common electrode panel includes a light blocking member, a color filter, and a common electrode.

For a high transmittance, low power consumption, and fast response speed, a liquid crystal display may include twisted-nematic liquid crystals. However, in such a twisted-nematic liquid crystal display, a pre-tilt angle of liquid crystal molecules may be changed after driving the display, such that a luminance difference is generated between a black mode and a white mode, thereby causing afterimages.

The above information disclosed in this Background section is only for enhancement of understanding of the background of the invention and therefore it may contain information that does not constitute prior art.

SUMMARY OF THE INVENTION

Exemplary embodiments of the present invention provide a liquid crystal display that prevents changes to the pre-tilt angle of liquid crystal molecules, after driving the display in is a twisted-nematic mode, to prevent the generation of afterimages.

Additional features of the invention will be set forth in the description which follows, and in part will be apparent from the description, or may be learned by practice of the invention.

A liquid crystal display, according to an exemplary embodiment of the present invention, includes: a first substrate and an opposing second substrate; an alignment layer formed on the first substrate and the second substrate, including a polymer obtained by copolymerizing a dianhydride monomer and a diamine monomer; and a liquid crystal layer interposed between the first substrate and the second substrate. The dianhydride monomer includes a compound represented by Formula 1 below, and the diamine monomer includes a compound represented by Formula 2 below.

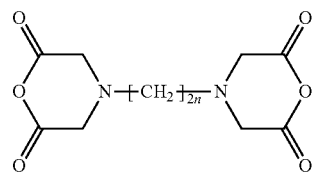

[Formula 1]

In Formula 1, n may be 0 or a positive integer.

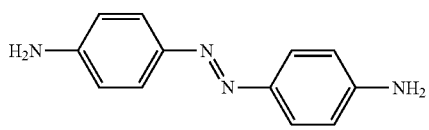

[Formula 2]

The dianhydride monomer may be further include pyromellitic acid dianhydride (PMDA), 1,2,3,4-cyclobutane tetracarboxylic acid dianhydride, or combinations thereof.

The diamine monomer may further include a compound represented by Formula 3.

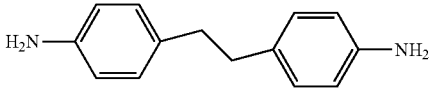

[Formula 3]

According to an exemplary embodiment of the present invention, the alignment layer suppresses a change of the pre-tilt angle, such that the luminance difference between the black mode and the white mode is decreased, thereby suppressing the formation of afterimages.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

Figure 1:
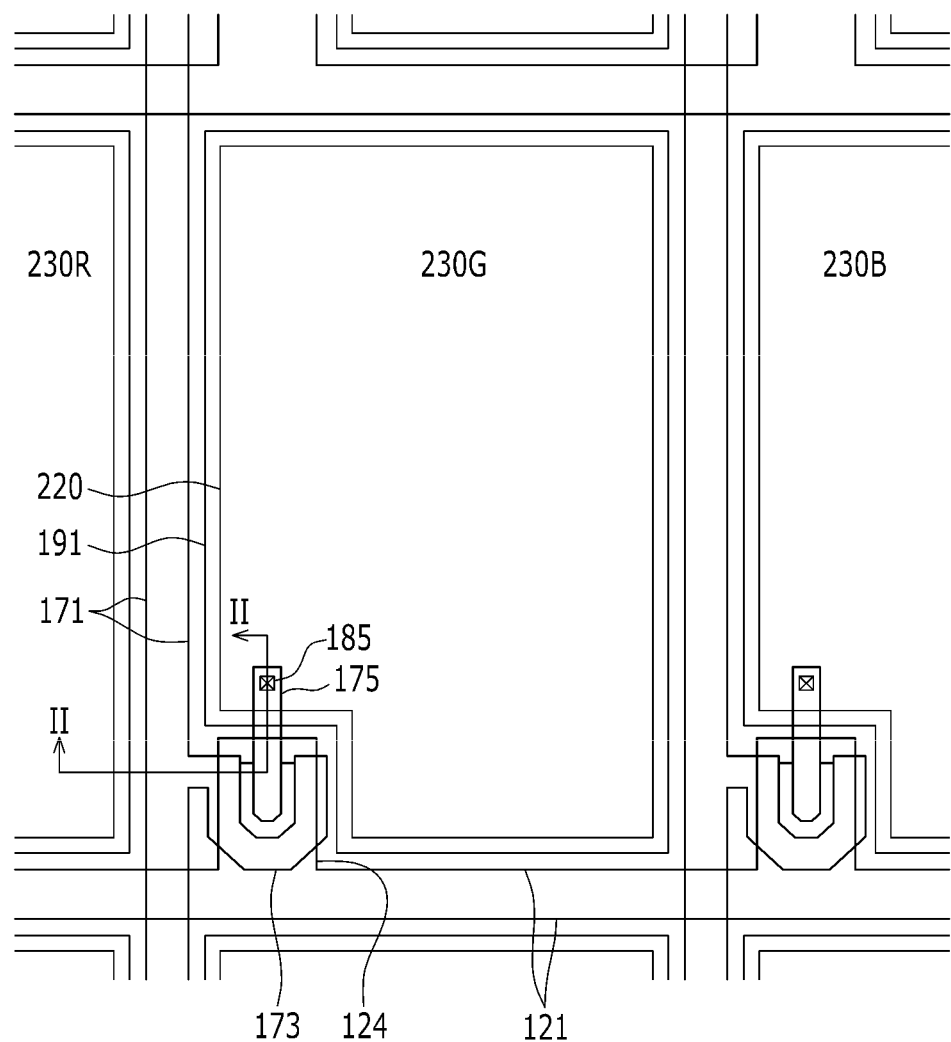
FIG. 1 is a layout view of a liquid crystal display, according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
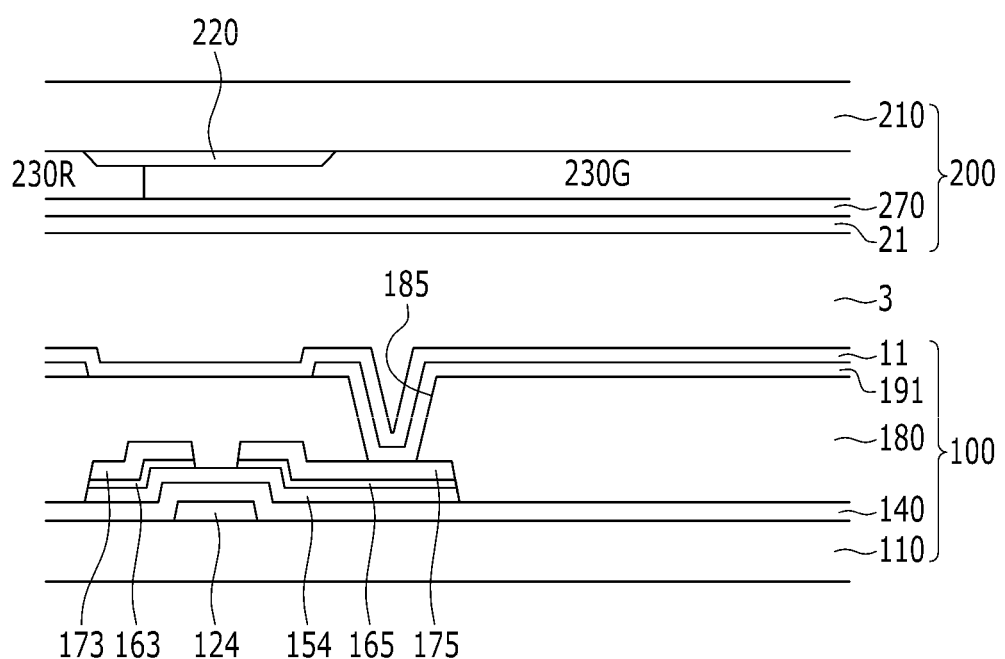
FIG. 2 is a cross-sectional view taken along the line II-II of FIG. 1.

FIG. 1 is a layout view of a liquid crystal display, according to an exemplary embodiment of the present invention, and FIG. 2 is a cross-sectional view taken along the line II-II of FIG. 1. As shown in FIG. 1 and FIG. 2, the liquid crystal display includes a thin film transistor array panel 100, an opposing common electrode panel 200, and a liquid crystal layer 3 interposed between the display panels 100 and 200.

The thin film transistor array panel 100 includes a plurality of gate lines 121 formed on a first substrate 110 made of an insulating material, such as glass or plastic. A gate insulating layer 140, a plurality of semiconductors 154, a plurality of ohmic contacts 163 and 165, and a plurality of data lines 171, and a plurality of drain electrodes 175 are sequentially formed thereon.

The gate lines 121 transmit a gate signal and mainly extend in a transverse direction. Each gate line 121 includes a plurality of gate electrodes 124 protruding upward therefrom.

The data lines 171 transmit a data signal and mainly extend in a longitudinal direction, thereby intersecting the gate lines 121. Each data line 171 includes a plurality of source electrodes 173 extending toward the gate electrodes 124. The drain electrodes 175 are separated from the data lines 171 and face the source electrodes 173 with respect to the gate electrodes 124.

The semiconductor 154 is positioned on the gate electrode 124. The ohmic contacts 163 and 165 are disposed between the semiconductor 154, the data line 171, and the drain electrode 175, thereby reducing the contact resistance therebetween. One gate electrode 124, one source electrode 173, and one drain electrode 175 form a thin film transistor (TFT), in conjunction the semiconductor 154. The channel of the thin film transistor is formed in the semiconductor 154, between the source electrode 173 and the drain electrode 175.

A passivation layer 180 is formed on the gate insulating layer 140, the data lines 171, and the drain electrodes 175. The passivation layer 180 has a contact hole 185 exposing the drain electrode 175.

A pixel electrode 191 is formed on the passivation layer 180. The pixel electrode 191 may be made of a transparent conductive material, such as indium tin oxide (ITO) or indium zinc oxide (IZO), or a reflective metal, such as aluminum or silver alloys. The pixel electrode 191 contacts the drain electrode 175 through the contact hole 185. A lower alignment layer 11 is is formed on the pixel electrode 191.

The common electrode panel 200 includes a light blocking member 220 formed on a second substrate 210 made of an insulating material, such as glass or plastic, and color filters 230R, 230G, and 230B formed on the light blocking member 220. A common electrode 270 is formed on the light blocking member 220 and the color filters 230R, 230G, and 230B. An upper alignment layer 21 is formed on the common electrode 270.

A liquid crystal layer 3 is positioned between the common electrode panel 200 and the thin film transistor array panel 100. The liquid crystal layer 3 includes a plurality of liquid crystal molecules, and the liquid crystal molecules are arranged such that they are twisted 90° when an electric field is not applied thereto (twisted-nematic liquid crystal molecules).

The lower and upper alignment layers 11 and 21 include a polymer including a polyamic acid and a polyimide. The polymer may be a copolymer formed by copolymerizing a dianhydride monomer and a diamine monomer. The monomers may be copolymerized at a ratio of about 1:1. The dianhydride monomer includes two anhydride groups that are connected linearly. The dianhydride monomer may include a compound represented by Formula 1 below.

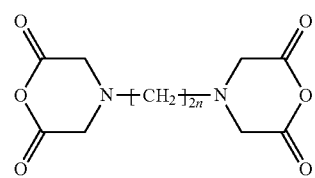

[Formula 1]

In Formula 1, n may be 0 or a positive integer. For example, 2n may be 0 or 2. The dianhydride monomer may include pyromellitic acid dianhydride (PMDA), 1,2,3,4-cyclobutane tetracarboxylic acid dianhydride, or combinations thereof.

The diamine monomer preferably may include two linearly connected amine groups (—NH2). The diamine monomer may include a compound represented by Formula 2 or Formula 3 below, or a combination thereof.

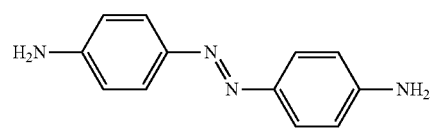

[Formula 2]

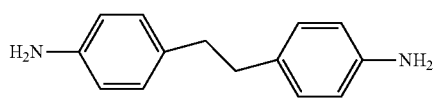

[Formula 3]

The dianhydride monomers and the diamine monomers provide a uniform pre-tilt angle and increase the stability of the pre-tilt angle when applied with a driving voltage. Accordingly, a luminance difference between the black mode and the white mode is decreased, thereby suppressing afterimages.

Characteristics of liquid crystal displays, according to an Exemplary Embodiment of the present invention, and Comparative Embodiments 1 and 2, under driving conditions, will be described with reference to Table 1. Table 1 compares the luminance of the black mode and the white mode of the liquid crystal displays.

The alignment layer of Comparative Example 1 is formed by polymerizing a dianhydride monomer represented by Formula 4 below and a diamine monomer represented by Formula 5 below.

[Formula 4]

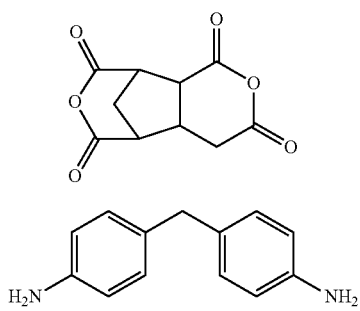

[Formula 5]

The alignment layer of the Exemplary Embodiment is formed by polymerizing a dianhydride monomer represented by Formula 6 below and a diamine monomer represented by Formula 2.

[Formula 6]

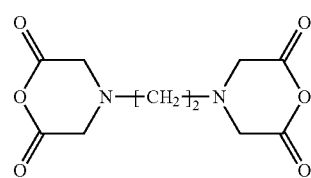

The alignment layer of Comparative Example 2 is formed by polymerizing the dianhydride monomer represented by Formula 6 and the diamine monomer represented by Formula 5.

TABLE 1

|  | Black | White | Δ(Black-White) absolute value |
|---|---|---|---|
| Comparative Example 1 | −1.82 | −0.76 | 1.06 |
| Exemplary Embodiment | −1.01 | −1.14 | 0.13 |
| Comparative Example 2 | −1.33 | −0.48 | 0.85 |

As shown in Table 1, the Exemplary Embodiment exhibits a small luminance difference between the black mode and the white mode, as compared with Comparative Example 1. This is because the alignment layer of the Comparative Example 1 includes the bent dianhydride and diamine monomers, such that the pre-tilt angle formed thereby is changed. Accordingly, the luminance difference between the black mode and the white mode is relatively large. However, since the alignment layer of the Exemplary Embodiment includes the linear dianhydride and diamine monomers, the pre-tilt angle thereof is comparatively small.

The alignment layer of Comparative Example 2 includes the linear dianhydride monomer and the bent diamine monomer. As such, the luminance difference between the black mode and the white mode is larger than that of the Exemplary Embodiment.

As described above, the alignment layer comprising the linear dianhydride and diamine monomers suppresses the change of the pre-tilt angle, such that the luminance difference between the black mode and the white mode is decreased, thereby reducing the formation of afterimages.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising: a first substrate and an opposing second substrate; a liquid crystal layer interposed between the first substrate and the second substrate; and an alignment layer disposed on the first substrate and the second substrate, the alignment layer comprising a copolymer formed by copolymerizing linear dianhydride monomers and linear diamine monomers comprising a linear dianhydride monomer represented by Formula 1 below, and linear diamine monomers represented by Formulas 2 and 3 below:

[Formula 1]

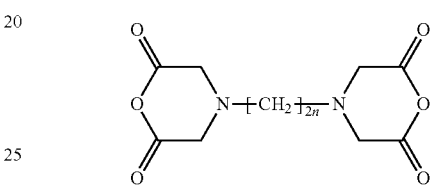

wherein in Formula 1, n is 0 or a positive integer;

[Formula 2]

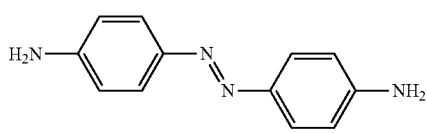

and

[Formula 3]

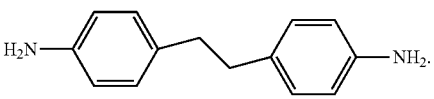

2. The liquid crystal display of claim 1, wherein n is 0 or 1.

3. The liquid crystal display of claim 1, wherein the linear dianhydride monomers further comprise pyromellitic acid dianhydride (PMDA), 1,2,3,4-cyclobutane tetracarboxylic acid dianhydride, or a combination thereof.

4. The liquid crystal display of claim 1, wherein the liquid crystal layer comprises twisted-nematic liquid crystal molecules.

5. The liquid crystal display of claim 1, further comprising:
a gate line disposed on the first substrate;
a data line disposed on the first substrate and intersecting the gate line;
a thin film transistor connected to the gate line and the data line;
a pixel electrode connected to the thin film transistor; and
a common electrode disposed on the second substrate.

6. The liquid crystal display of claim 1, wherein the alignment layer comprises the linear dianhydride monomers and the linear diamine monomers at a ratio of about 1:1.

* * * * *